United States Patent
Wang et al.

(10) Patent No.: US 6,501,788 B1
(45) Date of Patent: Dec. 31, 2002

(54) APPARATUS AND METHODS FOR INTEREFERENCE CANCELLATION IN SPREAD SPECTRUM COMMUNICATIONS SYSTEMS

(75) Inventors: Yi-Pin Eric Wang, Cary, NC (US); Ali Khayrallah, Apex, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/235,470

(22) Filed: Jan. 22, 1999

(51) Int. Cl.$^7$ .............................................. H04B 1/713
(52) U.S. Cl. ..................................... 375/148; 375/347
(58) Field of Search ................................ 375/144, 347, 375/349, 148, 150, 142, 346

(56) References Cited

U.S. PATENT DOCUMENTS

| | | | | |
|---|---|---|---|---|
| 5,465,269 A | * | 11/1995 | Schaffner et al. | 370/209 |
| 5,572,552 A | | 11/1996 | Dent et al. | 375/343 |
| 5,615,209 A | | 3/1997 | Bottomley | 370/342 |
| 5,673,291 A | | 9/1997 | Dent | 375/262 |
| 6,298,050 B1 | | 10/2001 | Van Heeswyk et al. | 370/335 |

FOREIGN PATENT DOCUMENTS

| | | |
|---|---|---|
| EP | 0 717 505 A2 | 6/1996 |
| WO | WO 97/08846 | 3/1997 |
| WO | WO 98/18210 | 4/1998 |

OTHER PUBLICATIONS

International Search Report, PCT/US99/26911, Mar. 15, 2000.

Barbosa et al., "Adaptive Detection of DS/CDMA Signals in Fading Channels," IEEE Trans. Commun., vol. 46, pp. 115–124, Jan. 1998.

Bottomley, "Optimizing the Rake Receiver for the CDMA Downlink," Proceedings of the 43$^{rd}$ IEEE Vehicular Technology Conference, Secaucus, NJ, May 18–20, 1993.

Davis et al., "A Noise Whitening Approach to Multiple–Access Noise Rejection–Part II: Implementation Issues," IEEE Journal of Selected Areas in Communications, vol. 14, Oct. 1996, pp. 1488–1499.

(List continued on next page.)

*Primary Examiner*—Stephen Chin
*Assistant Examiner*—Kevin Kim
(74) *Attorney, Agent, or Firm*—Myers Bigel Sibley & Sajovec

(57) ABSTRACT

A symbol is transmitted in a communications medium according to a first spreading sequence of a set of spreading sequences, for example, CDMA channelization codes, which may be used to transmit symbols in the system. A communications signal is received from the communications medium, for example, at a mobile terminal. The received communications signal is resolved into a plurality of multipath signal components by, for example, descrambling the received signal according to a cell-specific scrambling code. The resolved plurality of signal components is correlated with the set of spreading sequences to generate a respective set of correlations for a respective one of the resolved signal components, a respective one of the sets of correlations including a respective correlation of a resolved signal component with the first spreading sequence. An interference component associated with a second spreading sequence of the set of spreading sequences, identified based on the correlations of the resolved signal components with the set of possible spreading sequences, is cancelled from the correlations of the plurality of resolved signal components with the first spreading sequence, thus generating a set of interference-cancelled correlations of the resolved signal components with the first spreading sequence. The transmitted symbol is estimated from the set of interference-cancelled correlations. Preferably, the set of spreading sequences is orthogonal. More preferably, the set of spreading sequences comprises a Hadamard code, and the correlations of the set of possible spreading sequences with the resolved signal components is generated using a fast Hadamard transform.

51 Claims, 10 Drawing Sheets

OTHER PUBLICATIONS

Dent et al., "CDMA–IC: A Novel Division Multiple Access Scheme Based on Interference Cancellation," in Proc. PIMRC, Boston, Massachusetts, pp. 4.1.1–4.5.5, Oct. 1992.

Duel–Hallen et al., "Multiuser Detection of CDMA Systems," IEEE Personal Commun. Mag., vol. 2, pp. 46–58, Apr. 1995.

Ewerbring et al., "CDMA with Interference Cancellation: A Technique for High Capacity Wireless Systems," in Proc. IEEE Int. Conf. Commun., Geneva, Switzerland, 1993.

Harris et al. "Handbook of Mathematics and Computer Science," published by Springer–Verlag, New York, 1998, pp. 456–457.

Hottinen et al., "Multi–User Detection for Multi–Rate CDMA Communications," in Proc. IEEE Int. Conf. Commun., Dallas, Texas, Jun. 24–28, 1996.

Jamal et al., "Adaptive MLSE Performance on the D–AMPS 1900 Channel," IEEE Transactions on Vehicular Technology, vol. 46, Aug. 1997, pp. 634–641.

Juntti, M.J., "Multi–User Detector Performance Comparisons in Multi–Rate CDMA Systems," in Proc. IEEE VTC '98, pp. 31–55, Ottawa, Canada, May 1998.

Juntti, M.J., "System Concept Comparisons for Multi–Rate CDMA with Multi–User Detection," in Proc. IEEE VTC '98, pp. 36–40, Ottawa, Canada, May 1998.

Klein, Data Detection Algorithms Specifically Designed for the Downlink of CDMA Mobile Radio Systems, 1997 IEEE Vehicular Technology Conference, Pheonix, AZ, May 4–7, 1997.

Kohno et al., "Combination of an Adaptive Array Antenna and a Canceller of Interference for Direct–Sequence Spread– Spectrum Multiple–Access System," IEEE Journal on Selected Areas in Communication, vol. 8, No. 4, May 1990.

Liu et al., "Blind Equalization in Antenna Array CDMA Systems," IEEE Trans. Sig. Proc., vol. 45, pp. 161–172, Jan. 1997.

Madhow et al., "MMSE Interference Suppression for Direct- –Sequence Spread–Spectrum Communication," IEEE Trans. Commun. vol. 42, pp. 3178–3188, Dec. 1994.

Madkour et al., "Multi–Rate Multi–Code CDMA Using FWT For Mobile and Personal Communications," in Proceedings of The Ninth IEEE International Symposium on Personal, Indoor and Mobile Radio Communications, The Marriottt Copley Place, Boston, Massachusetts, Sep. 8–11, 1998.

Mailaender et al., "Linear Single–User Detectors for Asynchronous and Quasi–Synchronous CDMA," in Proc. $29^{th}$ Annual Conf. on Info. Sciences and Systems (CISS '95), Johns Hopkins University, pp. 199–204, 1995.

Monk et al., "A Noise Whitening Approach to Multiple Access Noise Rejection–Part I: Theory and Background," IEEE Journal on Selected Areas in Communications, vol. 12, Jun. 1994, pp. 817–827.

Muszynski, P., "Interference Rejection Rake–Combining for WCDMA," First Intl. Symposium on Wireless Personal Multimedia Communications (WPMC 'u), Yokosuka, Japan, pp. 93–98, Nov. 4–6, 1998.

Naguib et al., "Performance of CDMA Cellular Networks with Base–Station Antenna Arrays," Presented at the 1994 International Zurich Seminar on Digital Communications (no date).

Ng et al., "A Structured Channel Estimator for Maximum–Likelihood Sequence Detection," IEEE Commun. Letters, vol. 1, pp. 52–55, Mar. 1997.

Ojanpera et al., "Qualitative Comparison of Some Multi–User Detector Algorithms for Wideband CDMA," in Proc. IEEE VTC '98, pp. 46–50, Ottawa, Canada, May 1998.

Patel et al., "Analysis of a DS/CDMA Successive Interference Cancellation Scheme in DS/CDMA System Using Correlations," in Proc. GLOBECOM, Houston, Texas, pp. 76–80, 1993.

Patel et al., "Analysis of a Simple Successive Interference Cancellation Scheme in DS/CDMA System," IEEE JSAC, vol. 12, No. 5, pp. 796–807, Jun. 1994.

Pateros et al., "An Adaptive Correlator Receiver for Direct–Sequence–Spread–Spectrum Communication," IEEE Trans. Commun., vol. 44, pp. 1543–1552, Nov. 1996.

Picinbono, B., "On Circularity," IEEE Trans. Sig. Proc., vol. 42, pp. 3473–3482, Dec. 1994.

Picinbono, B., "Second–Order Complex Random Vectors and Normal Distrubutions," IEEE Trans. Sig. Proc., vol. 44, pp. 2637–2640, Oct. 1996.

Wang et al., "Blind Multi–User Detection: A Subspace Approach," IEEE Trans. Info. Theory, vol. 44, No. 2, pp. 677–690, Mar. 1998.

Yoon et al., "A Spread–Spectrum Multiaccess System with Cochannel Interference Cancellation for Multipath Fading Channels," IEEE J. Select. Areas Commun., vol. 11, No. 7, pp. 1067–1075, Sep. 1993.

Yoon et al., "Matched Filtering in Improper Complex Noise and Applications to DS–CMDA," Sixth IEEE Intl. Symp. Personal, Indoor, Mobile Radio Commun. (PIMRC '), Toronto, Sep. 27–29, 1995.

Yoon et al., "Matched Filters with Interference Suppression Capabilities for DS–CDMA," IEEE J. Sel. Areas Commun., vol. 14, pp. 1510–5121, Oct. 1996.

Yoon et al., "Maximizing SNR in Improper Complex Noise and Applications to CDMA," IEEE Commun. Letters, vol. 1, pp. 5–8, Jan. 1997.

Zvonar et al., "Sub–Optimal Multi–User Detector for Frequency Selective Rayleigh Fading Synchronous CDMA Channels," IEEE Trans. Commun., vol. 43, No. 2/3/4, pp. 154–157, Feb./Mar./Apr. 1995.

Adachi et al., "Wideband DS–CDMA for Next–Generation Mobile Communications Systems," IEEE Communications Magazine, Sep., 1998, pp. 56–69.

Bottomley et al., "Adaptive Arrays and MLSE Equalization," Proc. 1995 IEEE $45^{th}$ Vehicular Technology Conference (VTC '95), Chicago, Jul. 25–28, 1995, 5 pgs.

Dahlman et al., "UMTS/IMT–2000 Based on Wideband CDMA," IEEE Communications Magazine, Sep. 1998, pp. 70–80.

Dinan et al., "Spreading Codes for Direct Sequence CDMA and Wideband CDMA Cellular Networks," IEEE Communications Magazine, Sep. 1998, pp. 48–54.

Gumas, "A century old, the fast Hadamard transform proves useful in digital communications," Personal Engineering, Nov. 1997, pp. 57–63.

Peterson et al., "Introduction to Spread–Spectrum Communications," Prentice Hall International, Inc., pp. 540–547.

* cited by examiner

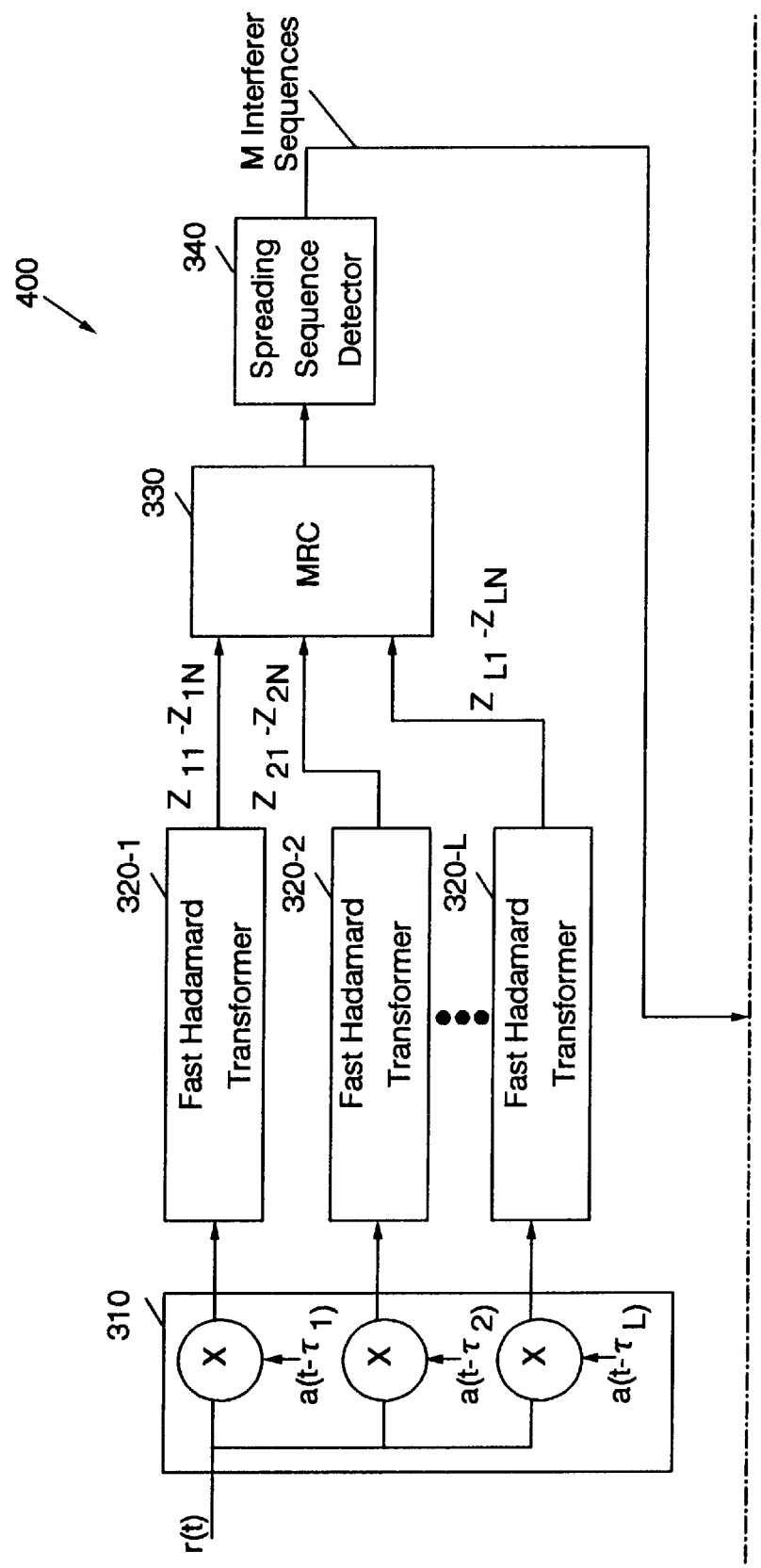

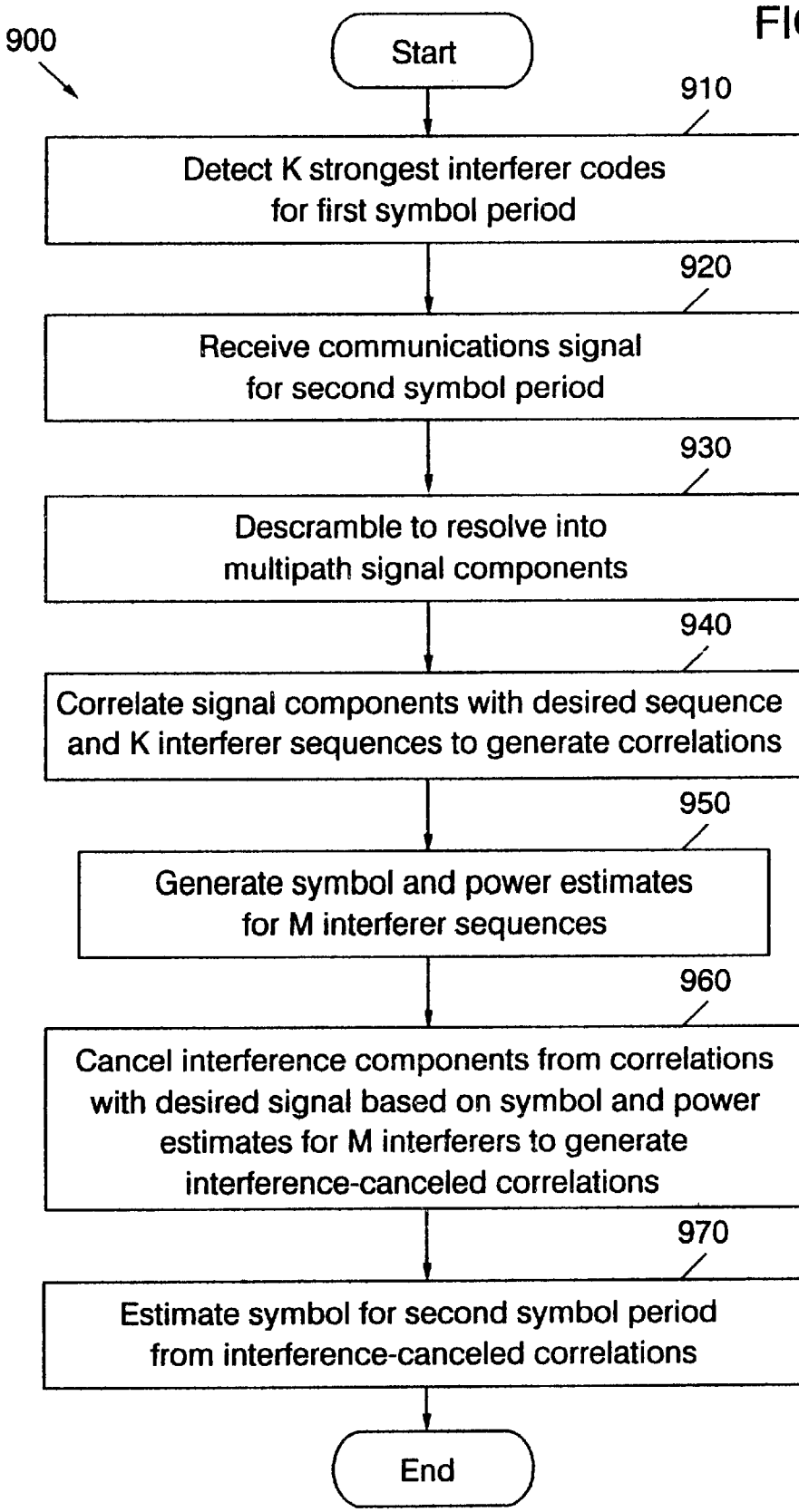

APPARATUS AND METHODS FOR INTEREFERENCE CANCELLATION IN SPREAD SPECTRUM COMMUNICATIONS SYSTEMS

FIELD OF THE INVENTION

The present invention relates to communications systems and methods, and more particularly, to spread spectrum communications systems and methods.

BACKGROUND OF THE INVENTION

Wireless communications systems are commonly employed to provide voice and data communications to subscribers. For example, analog cellular radiotelephone systems, such as those designated AMPS, ETACS, NMT-450, and NMT-900, have been long been deployed successfully throughout the world. Digital cellular radiotelephone systems such as those conforming to the North American standard IS-54 and the European standard GSM have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data), as described in *The Mobile Communications Handbook*, edited by Gibson and published by CRC Press (1996). Proposed next-generation systems utilizing technology such as wideband code division multiple access (W-CDMA) will offer a wide array of multimedia services.

FIG. 1 illustrates a typical terrestrial cellular radiotelephone communication system 20. The cellular radiotelephone system 20 may include one or more radiotelephones (terminals) 22, communicating with a plurality of cells 24 served by base stations 26 and a mobile telephone switching office (MTSO) 28. Although only three cells 24 are shown in FIG. 1, a typical cellular network may include hundreds of cells, may include more than one MTSO, and may serve thousands of radiotelephones.

The cells 24 generally serve as nodes in the communication system 20, from which links are established between radiotelephones 22 and the MTSO 28, by way of the base stations 26 serving the cells 24. Through the cellular network 20, a duplex radio communication link may be effected between two mobile terminals 22 or between a mobile terminal 22 and a landline telephone user 32 through a public switched telephone network (PSTN) 34. The function of a base station 26 is to handle radio communication between a cell 24 and mobile terminals 22. In this capacity, a base station 26 functions as a relay station for data and voice signals.

As illustrated in FIG. 2, a satellite 42 may be employed to perform similar functions to those performed by a conventional terrestrial base station, for example, to serve areas in which population is sparsely distributed or which have rugged topography that tends to make conventional landline telephone or terrestrial cellular telephone infrastructure technically or economically impractical. A satellite radiotelephone system 40 typically includes one or more satellites 42 that serve as relays or transponders between one or more earth stations 44 and terminals 23. The satellite conveys radiotelephone communications over duplex links 46 to terminals 23 and an earth station 44. The earth station 44 may in turn be connected to a public switched telephone network 34, allowing communications between satellite radiotelephones, and communications between satellite radio telephones and conventional terrestrial cellular radiotelephones or landline telephones. The satellite radiotelephone system 40 may utilize a single antenna beam covering the entire area served by the system, or, as shown, the satellite may be designed such that it produces multiple minimally-overlapping beams 48, each serving distinct geographical coverage areas 50 in the system's service region. The coverage areas 50 serve a similar function to the cells 24 of the terrestrial cellular system 20 of FIG. 1.

Traditional analog cellular systems generally employ frequency division multiple access (FDMA) to create communications channels. However, the tremendous increase in the number of users of wireless services and the demand for data and other non-voice services have led to the development of other techniques that can utilize the available spectrum in a more efficient manner. These more advanced techniques include time division multiple access (TDMA), in which communications from multiple users are time-multiplexed on frequency bands in system-defined time "slots," and "spread spectrum" or code division multiple access (CDMA) techniques in which channels of a system are defined by modulating data-modulated carrier signals by unique spreading codes, i.e., codes that spread data-modulated carriers over the frequency spectrum in which the communications system operates. The use of unique spreading codes for channels allows several users to effectively share the same bandwidth.

In proposed wideband CDMA systems, such as a W-CDMA system conforming to the UMTS/IMT-2000 specifications, downlink (base station to subscriber terminal) signals for different channels within a cell are transmitted synchronously by the base station using a scrambling code specific to the cell. Typically, orthogonal channelization codes or sequences, also known as spreading codes, are assigned to distinct physical channels transmitted in a cell, thus creating orthogonal downlink signals within the cell. If the communications medium in which the signals are transmitted does not introduce delay spread, this orthogonality may be maintained at the receiving terminal, thus reducing the likelihood of multi-user (inter-user) interference. However, if the communications medium in which the signals are transmitted introduces delay spread, orthogonality may not be maintained at the receiving terminal. This can increase multi-user interference, and may degrade performance.

Performance may be severely degraded in the presence of a so-called "near-far" problem, i.e., when a weak desired signal is received at a receiving station along with a strong interfering signal. In a typical uplink to a base station, this problem may be managed by power control techniques, e.g., by boosting the desired signal such that all signals arrive at the base station at substantially the same power. However, such power control typically is not feasible for a downlink to a subscriber terminal.

It is known that a signal transmitted over a wide band of frequencies generally may produce more multipath signal components than a signal transmitted over a narrower bandwidth. Thus, for example, a channel in a wideband CDMA system generally exhibits a higher degree of dispersiveness than a channel in a narrower bandwidth system such as a system conforming to the IS-95 CDMA standard. Consequently, W-CDMA systems generally have a higher likelihood of multi-user interference than their narrower-bandwidth precursors.

Moreover, proposed W-CDMA systems that allow for the use of variable spreading factors to allow users to achieve varying data rates may be more vulnerable to multi-user interference. For example, proposed W-CDMA systems envision the use of high spreading factors (on the order of 128) for voice channels and the use of lower spreading factors for high-speed data services. If such voice and data services are designed to exhibit comparable link quality, i.e., comparable end-to-end user data reliability, the low-spreading factor signals will generally be transmitted with much higher power than the high spreading factor signals. This power discrepancy may exacerbate multi-user interference in a dispersive medium.

Variable spreading factor schemes which allow for the concurrent use of high and low spreading codes can also exacerbate the "near-far" problem. For example, a user located near the edge of a cell transmitting with a low spreading factor and high power may significantly interfere at a receiving terminal with a high-spreading factor, low-power user positioned nearer the receiving terminal. In addition, a signal with a low spreading factor can degraded by a relatively low power interferer signal, as the lower spreading factor generally renders the desired signal less amenable to interference suppression than a signal using a higher spreading factor.

Interference cancellation techniques have been proposed, but these techniques are generally better suited to application at base stations than at mobile terminals. These conventional techniques typically act on the assumption that the receiver has a priori knowledge of the spreading sequences currently in use in a cell. These conventional interference cancellation techniques also tend to be complex, which can result in significant equipment cost and power consumption that may be disadvantageous in devices such as battery-operated hand-held terminals.

SUMMARY OF THE INVENTION

In light of the foregoing, it is an object of the present invention to provide communications apparatus and methods that can reduce multi-user interference in spread-spectrum communications systems.

It is another object of the present invention to provide communications apparatus and methods can reduce multi-user interference in systems using variable spreading factors.

It is another object of the present invention to provide communications apparatus and methods for multi-user interference cancellation that can be implemented in manner that is less complex and power consuming than conventional techniques.

These and other objects, features and advantages are provided according to the present invention by spread spectrum communications systems and methods in which multipath signal components of a received signal are correlated with a set of possible spreading sequences including a desired sequence, preferably using a fast Hadamard transform. The resulting correlations are combined to detect one or more interferer sequences, and interference components associated with the detected interferer sequences are canceled from correlations with the desired sequence to produce interference-canceled correlations. A symbol estimate is generated from the interference-canceled correlations. The interferer sequences may be detected by maximal ratio combining the correlations generated by the fast Hadamard transform and identifying one or more interferer sequences based on whether an energy associated with the interference sequence meets a predetermined criterion such as a threshold value or a nearest neighbor rule. Identification of interferer sequences may be done on a symbol by symbol basis or, in fixed spreading factor systems, interferer sequences may be identified on an intermittent basis, i.e., in selected symbol periods, and reduced-complexity correlations performed for the identified sequences in other symbol periods to generate interference component estimates. Interference cancellation techniques are thereby provided that are relatively less complex and power consuming than conventional techniques.

In particular, according to the present invention, a symbol is transmitted in a communications medium according to a first spreading sequence of a set of spreading sequences that may be used to transmit symbols in the system. A communications signal is received from the communications medium, for example, at a mobile terminal. The received communications signal is resolved into a plurality of signal components, a respective one of which is associated with a respective propagation path. For example, the resolved signal components may be generated by descrambling the received signal according to a cell-specific scrambling code. The resolved plurality of signal components is correlated with the set of spreading sequences to generate a respective set of correlations for a respective one of the resolved signal components, a respective one of the sets of correlations including a respective correlation of a resolved signal component with the first spreading sequence. An interference component associated with a second spreading sequence of the set of spreading sequences, identified based on the correlations of the resolved signal components with the set of possible spreading sequences, is cancelled from the correlations of the plurality of resolved signal components with the first spreading sequence, generating a set of interference-cancelled correlations of the resolved signal components with the first spreading sequence. The transmitted symbol is estimated from the set of interference-cancelled correlations.

Preferably, the set of spreading sequences is orthogonal. More preferably, the set of spreading sequences comprises a Hadamard code, and the correlations of the set of possible spreading sequences with the resolved signal components is generated using a fast Hadamard transform.

According to an aspect of the present invention, interference cancellation is achieved by combining correlations for resolved signal components to determine respective energies for respective spreading sequences, and identifying an interferer spreading sequence having an associated energy meeting a predetermined criterion. The combining may be accomplished using, for example, maximal ratio combining techniques, or other combining techniques such as interference rejection combining (IRC). The predetermined criteria may be, for example, a highest energy criterion or a threshold criterion.

According to another aspect of the present invention, symbol and power estimates are generated for an interferer signal(s) transmitted according to the identified sequence(s), and the interference components are determined from the symbol and power estimates. The symbol and power estimates may be generated from the output of the combining process.

According to yet another aspect of the present invention well suited for use in a system using fixed spreading factor codes, interferer sequences may be identified on an intermittent basis and used to generate estimates of interference components during intervening time periods. In other words, an interferer sequence may be detected for a first symbol period of a desired sequence, and used to generate an estimate of a corresponding interference component during a subsequent second symbol period of the desired signal.

An apparatus for recovering a symbol from a communications signal comprises a multipath resolver operative to resolve the communications signal into a plurality of signal components, a respective one of which is associated with a respective propagation path. A spreading sequence correlator is responsive to the multipath resolver and operative to correlate resolved signal components with a set of spreading sequences to generate a respective set of correlations for a respective one of the resolved signal components, a respective one of the sets of correlations including a respective correlation of a resolved signal component with a first spreading sequence. An interference canceler is responsive to the spreading sequence correlator and operative to cancel an interference component associated with an interferer using a second spreading sequence of the set of spreading sequences from the correlations of the plurality of resolved signal components with the first spreading sequence based on the correlations of the plurality of resolved signal components with the second spreading sequence, thus generating a set of interference-cancelled correlations of the resolved signal components with the first spreading sequence. A symbol estimator is responsive to the interference canceler and operative to estimate the transmitted symbol from the set of interference-cancelled correlations of the resolved signal components with the first spreading sequence. Improved spread spectrum communications may thereby be provided.

BRIEF DESCRIPTION OF THE DRAWINGS

FIGS. 8–9 illustrate exemplary symbol estimation operations according to various embodiments of the present invention.

DETAILED DESCRIPTION OF EMBODIMENTS

Figure 1:
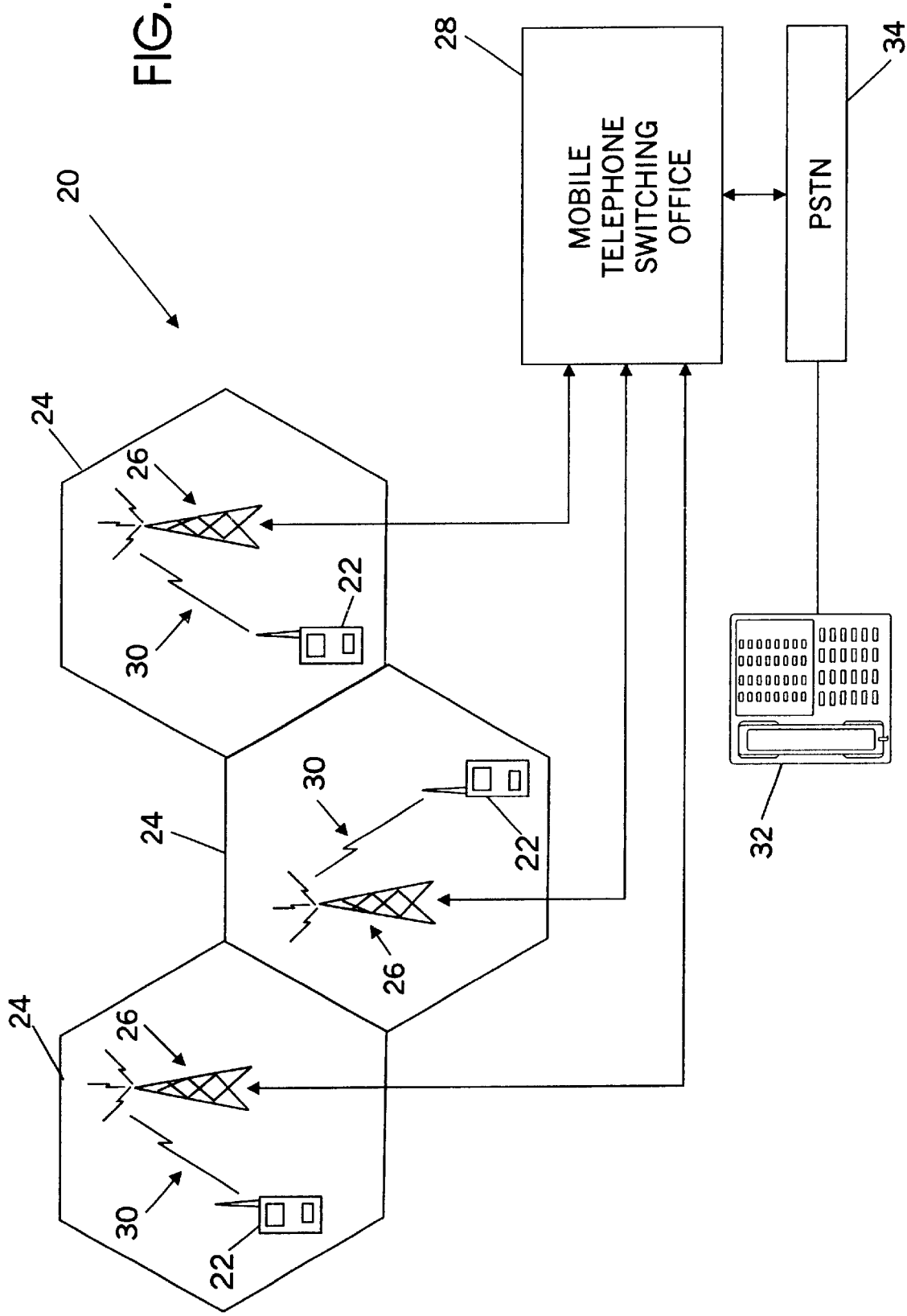
FIGS. 1–2 illustrate conventional cellular communications systems.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

By way of introduction, an analysis of spread spectrum signals will now be presented. This analysis specifically relates to the application of spread spectrum techniques in a wireless cellular system in which signals transmitted in a given cell are spread using a combination of sequences (or codes) including a user-specific channelization sequence and a cell-specific scrambling sequence. Those skilled in the art will appreciate, however, that the following discussion is also applicable to other spread spectrum systems.

Letting $s_k(t)$ denote a spread spectrum signal generated after application of a channelization sequence $c_k$, but before scrambling:

$$s_k(t) = \sum_i b_i^k c_k(t - iNT_c),$$

where $b_i^k$ denotes the ith data symbol for the kth user, $c_k(t)$ denotes the spreading sequence waveform for the kth user, N represents the spreading factor and $T_c$ represents the chip duration. The spreading sequence waveform $c_k(t)$ may be given as:

$$c_k(t) = \sum_{i=0}^{N-1} m_i^k p_{T_c}(t - iT_c),$$

where $p_{T_c}(t)$ denotes a rectangular pulse of the chip duration $T_c$, and $m_i^k$ denotes the ith chip of the spreading sequence for the kth user.

If the channelization spreading sequence waveforms are orthogonal:

$$\int_0^{NT_c} c_k(t) c_j^*(t) = 0, \quad k \neq j.$$

A scrambling sequence a(t) may be given by:

$$a(t) = \sum_i a_i p_{T_c}(t - iT_c),$$

where $a_i$ is the ith chip of the scrambling sequence. Applying the scrambling code a(t) to K user signals $s_k(t)$ produces a composite signal x(t):

$$x(t) = \sum_{k=1}^{K} \sqrt{P_k} \, s_k(t) a(t),$$

where $P_k$ is the transmitted power for a kth user signal $s_k(t)$.

The impulse response $h_c(t)$ of a channel can be expressed as:

$$h_c(t) = \sum_{l=1}^{L} \alpha_l \delta(t - \tau_l),$$

where L represents the number of multipath (propagation paths), and $\alpha_l$ and $\tau_l$ represent an attenuation factor and a delay, respectively, for an lth path.

A received signal r(t) may then be given by:

$$r(t) = \sum_{l=1}^{L} \alpha_l x(t - \tau_l) + n(t),$$

where n(t) denotes a noise component that includes multi-user interference from other cells (users employing other scrambling sequences) and thermal noise, as this intercell interference and thermal noise can be modeled as random processes having Gaussian distributions.

A typical conventional spread spectrum CDMA receiver includes a plurality of L fingers or branches. It will be appreciated that the number of fingers L may be determined in a number of different ways known to those skilled in the art, and that detailed discussion of such techniques is not required for the understanding of the present invention. At a respective one of the branches, the received signal r(t) is correlated with a time-shifted version of the combination of the scrambling code and the spreading code for the receiver. A correlation $z_l$ for a $1^{st}$ user produced from a $1^{st}$ finger of such a receiver may be expressed as:

$$z_{11} = \int_{\tau_1}^{\tau_1+NT_c} r(t)a^*(t-\tau_1)c_1^*(t-\tau_1)dt,$$

where * denotes a complex conjugate. The correlation $z_{ll}$ may be viewed as including a signal component $Z_{ll,s}$, an intersymbol interference component $z_{ll,ISI}$, an multi-user interference component $z_{ll,MUI}$, and a noise component $z_{ll,n}$.

The multi-user interference component $z_{ll,MUI}$ for a $1^{st}$ user arising from K−1 interferes may be expressed as:

$$z_{11,MUI} = \sum_{k=2}^{K}\sum_{l=2}^{L}\int_{\tau_1}^{\tau_1+NT_c}\alpha_l\sqrt{P_k}\, s_k(t-\tau_l)a^*(t-\tau_1)c_1^*(t-\tau_1)dt, \quad \text{or}$$

$$z_{11,MUI} = \int_{\tau_1}^{\tau_1+NT_c}\sum_{k=2}^{K}\sum_{l=2}^{L}\alpha_l\sqrt{P_k}\, s_k(t-\tau_l)a^*(t-\tau_1)c_1^*(t-\tau_1)dt.$$

Assuming that $NT_c$, the product of the spreading factor N and the chip duration $T_c$, is much greater than the delay $\tau_L$ for the Lth multipath signal, the multi-user interference component $z_{ll,MUI}$ may be approximated as:

$$z_{11,MUI} \approx$$

$$\int_{\tau_1}^{\tau_1+NT_c}\left(\sum_{l=2}^{L}\alpha_l\left(\sum_{k=2}^{K}\sqrt{P_k}\, b_0^k c_k(t-\tau_l)\right)a(t-\tau_l)\right)a^*(t-\tau_1)c_1^*(t-\tau_1)dt.$$

Generalizing for an ith finger for the $1^{st}$ user:

$$z_{1i,MUI} \approx$$

$$\int_{\tau_1}^{\tau_1+NT_c}\left(\sum_{\substack{l=1 \\ l \neq i}}^{L}\alpha_l\left(\sum_{k=2}^{K}\sqrt{P_k}\, b_0^k c_k(t-\tau_l)\right)a(t-\tau_l)\right)a^*(t-\tau_i)c_1^*(t-\tau_i)dt.$$

Thus, if the spreading codes $c_k(t)$, k=2, 3, ..., K, the data symbols $b_0^2$, ..., $b_0^k$, and the power levels $P_2$, ..., $P_K$ are known, the multi-user interference component $z_{li,MUI}$ can be calculated and canceled.

According to aspects of the present invention, a signal r(t) received by a station such as a mobile terminal in a communications system is first resolved into a plurality of multipath signal components, for example, by descrambling, receiving at a plurality of spatially or polarization diverse antennas, or the like Each of these resolved components is then correlated with each of N possible spreading sequences that may be used to transmit signals to such a station, e.g., the set of possible channelization spreading sequences that may be used for downlink communications to mobile terminals in a cell of a CDMA system. The resulting correlations may then be combined using, for example, maximal ratio combining techniques, to determine energies associated with each of the possible spreading sequences. The energies can be used to identify selected sequences, more particularly, sequences used by extraneous signals that are most likely to interfere with a desired signal that is transmitted using a desired spreading sequence. Symbol and power estimates may then be generated for the selected spreading sequences. These symbol and power estimates are used to cancel interference components in the correlations of the received signal with the desired spreading sequence. The interference-canceled correlations may then be combined to generate a symbol estimate. Preferably, the N spreading sequences represent a Hadamard code, allowing increased computational efficiency to be gained by using a fast Hadamard transform (FHT) technique to generate the correlations of the resolved multipath signal components with the N-sequences in each finger of the receiver.

Exemplary Receiver Architectures

Figure 3:
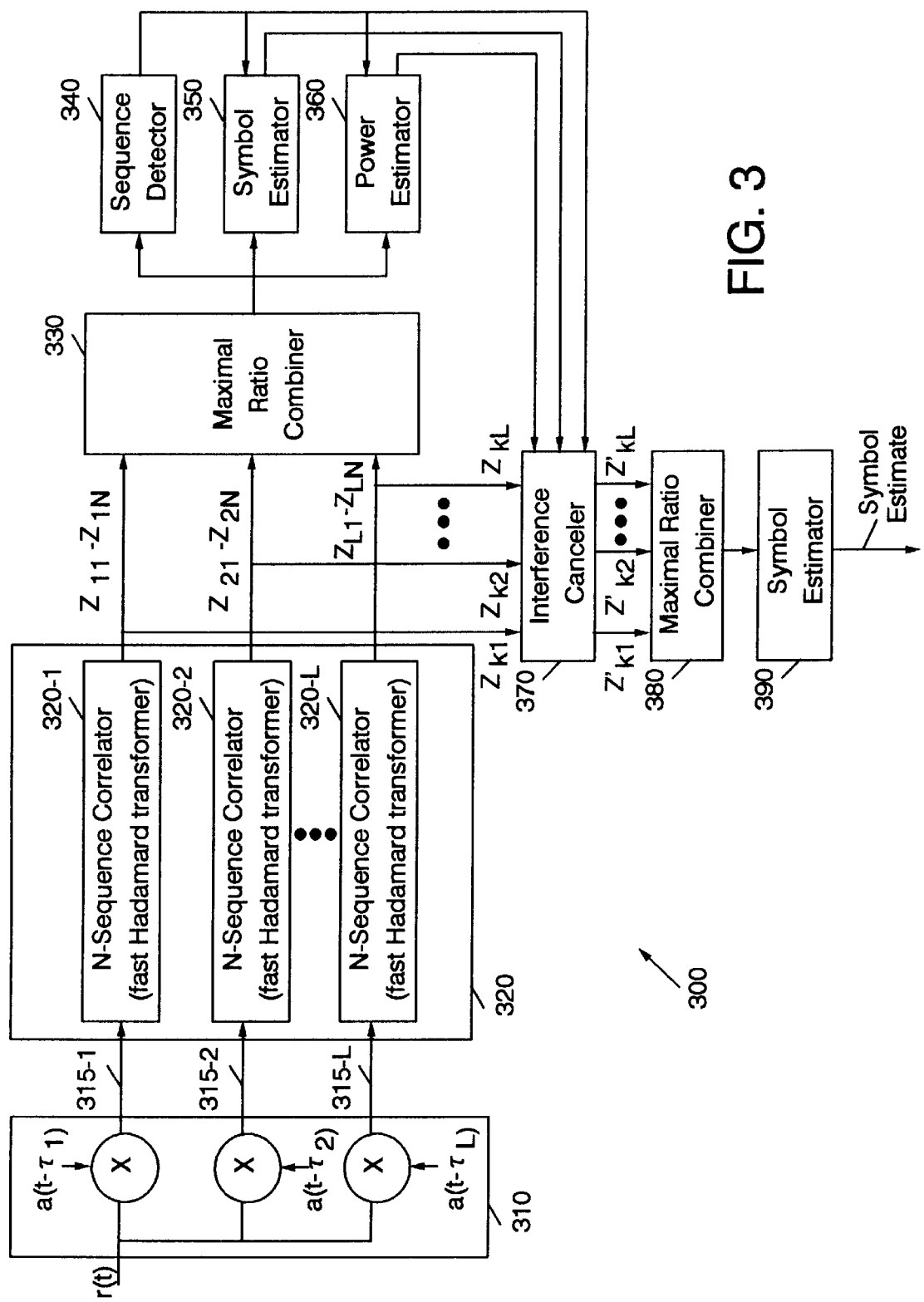
FIG. 3 illustrates a symbol estimation apparatus according to an embodiment of the present invention.

FIG. 3 illustrates a receiver apparatus 300 according to an embodiment of the present invention, for recovering a symbol transmitted in a communications medium according to a spreading sequence of a plurality of N possible spreading sequences. A received signal r(t) is resolved into a plurality of multipath signal components by a multipath resolver 310, e.g., a descrambler that correlates the received signal with time-shifted versions of a scrambling sequence a(t), producing a plurality of L resolved signal components 315-1, ..., 315-L, a respective one of which is associated with a propagation path. Each of the resolved signal components 315-1, ..., 315-L is then correlated with the N possible sequences by a correlator 320 including a plurality of N-sequence correlators 320-1, ..., 320-L to produce a plurality of correlations $z_{ll}$–$z_{LN}$. The correlations $z_{ll}$–$z_{LN}$ include correlations $z_{kl}$–$z_{kL}$ of the multipath signal components with a desired kth sequence.

Preferably, the N-spreading sequences are orthogonal. More preferably, the set of spreading sequences comprises a Hadamard code, and the correlators 320-1, ..., 320-L comprise a plurality of fast Hadamard transformers that take advantage of the symmetries of the Hadamard code to reduce computational complexity. Fast Hadarnard transforms are described in a text entitled *Introduction to Spread Spectrum Communications*, published by Prentice Hall (1995), pp. 544–545. Those skilled in the art will appreciate, however, that the present invention may also be used when the set of spreading sequences is non-orthogonal; for example, the present invention may be advantageously applied when the set of spreading sequences is "quasi-orthogonal," i.e., when the sequences of the set exhibit minimal correlation between one another.

The correlations zll–$z_{LN}$ are combined by a combiner 330, e.g., a maximal ratio or other combiner, to determine respective energies of signal components of the received signal r(t) associated with respective ones of the spreading sequences. A sequence detector 340 is responsive to the combiner 330, and identifies one or more spreading sequences (other than the desired kth spreading sequence) that are associated with multi-user interference in the received signal r(t). For example, the sequence detector 340 may identify a set of spreading sequences that have energies that exceed a predetermined threshold. Alternatively, the sequence detector 340 may identify a set of codes having the highest associated energies, i.e., the sequence detector 340 may operate on a "nearest neighbor" principle, choosing those sequences associated with the signals most like to contribute to multi-user interference.

Those skilled in the art will appreciate that the combiner 330 may utilize other techniques than maximal ratio combining. For example, hard-decision combining techniques may be used; however, such techniques may not be the most desirable, as they may not provide the energy estimation desired for interference cancellation. Interference rejection combining (IRC) techniques such as those described, for example, in "Adaptive Arrays and MLSE Equalization," by Bottomley et al., Proc. 45th IEEE Veh. Tech. Conf. (Chicago Ill., Jul. 25–28, 1995), may also be used.

A symbol estimator 350 and a power estimator 360 are responsive to the combiner 330 and the sequence detector 340. The symbol estimator 350 generates a symbol estimate (s) for an interferer signal(s) transmitted according to the sequence(s) identified by the sequence detector 340. The power estimator 360 generates a power estimate(s) for the interferer signal(s), an estimate that may be generated directly from the energies determined by the combiner 330.

The sequences identified by the sequence detector 340, along with the symbol estimates and the power estimates generated by the symbol estimator 350 and the power estimator 360, are provided to an interference canceler 370. The interference canceler 370 cancels interference components in the correlations $z_{k1}$–$z_{kL}$ of the kth spreading sequence and the multipath signal components 315-1, . . . , 315-L, producing interference-canceled correlations $z'_{k1}$–$z'_{kL}$. The interference-canceled correlations $z'_{k1}$–$z'_{kL}$ are then combined in a maximal ratio combiner 380, which produces an output (e.g., a soft information output) that may be used by a symbol estimator 390 (e.g., a decision device) to estimate a symbol transmitted according to the kth spreading code.

Those skilled in the art will appreciate that the descrambler 310, correlator 320, combiner 330, sequence detector 340, symbol estimator 350, power estimator 360, interference canceler 370, combiner 380 and symbol estimator 390 may be implemented using a variety of hardware and/or software. For example, these components may be implemented using special-purpose hardware such as an application specific integrated circuit (ASIC) or field programmable gate array (FPGA), software and/or firmware running on a general or special purpose computing device such as a microprocessor or a digital signal processing (DSP) chip, or combinations thereof.

Figure 4B:
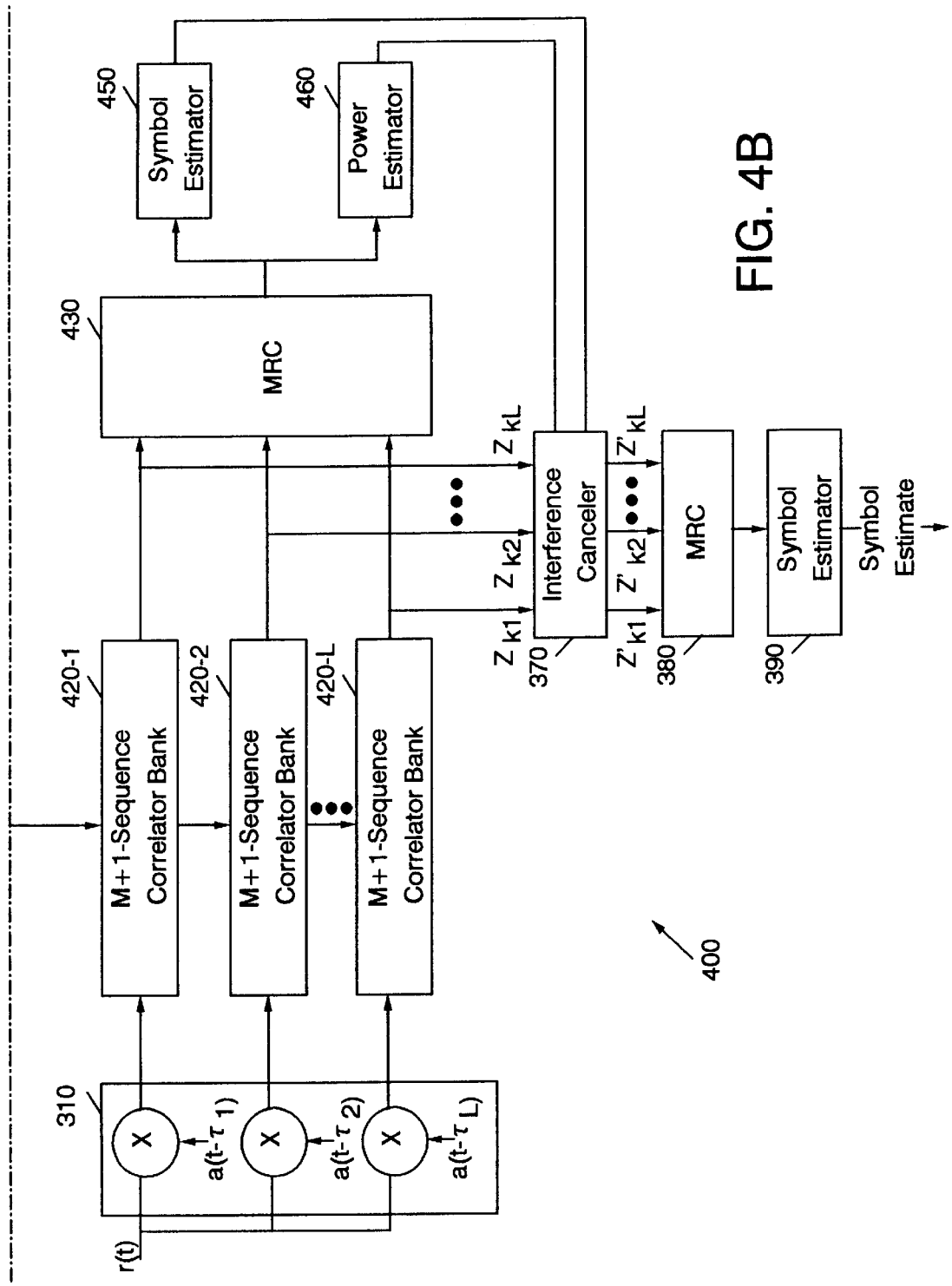
FIG. 4 illustrates a symbol estimation apparatus according to another embodiment of the present invention.

A second embodiment according to the present invention, suited for use in spread spectrum communications systems which use a fixed spreading factor, is illustrated in FIG. 4. A receiving apparatus 400 includes a descrambler 310 coupled to a plurality of fast Hadamard transformers 320-1, . . . , 320-L that produces a plurality of correlations $z_{l1}$–$z_{LN}$. The correlations $z_{l1}$–$z_{LN}$ are combined in a maximal ratio combiner 330, and a sequence detector 340 identifies M (one or more) spreading sequence(s) associated with interfering user(s). The identified sequence(s) are fed to reduced-scale banks of correlators 420-1, . . . , 420-L that produce correlations of the desired kth sequence and the M identified interferer sequence(s) with multipath signal components generated by the descrambler 310.

Symbol and power estimates for signals associated with the interferer sequences are generated by a maximal ratio combiner 430, a symbol estimator 450, and a power estimator 460. The power and symbol estimates are fed into an interference canceler 370 that generates interference-canceled correlations $z'_{k1}$–$z'_{kL}$ of the kth spreading sequence with the multipath signal components produced by the scrambler 310. A maximal ratio combiner 380 and a symbol estimator 390 generate a symbol estimate from the interference-canceled correlations $z'_{k1}$–$z'_{kL}$.

Those skilled in the art will appreciate that the configuration of FIG. 4 is suited for interference cancellation in a spread spectrum system that employs a fixed spreading factor, such as in systems conforming to the IS-95 standard. Interferer sequences may be identified in selected symbol periods, and the identified sequences used in intervening symbol periods to perform interference cancellations. The configuration of FIG. 4 is more advantageous in situations in which a few interferers are identified, such that the complexity of the correlators 420-1, . . . , 420-L can be minimized.

As with the apparatus 300 of FIG. 3, those skilled in the art will appreciate that components of the apparatus 400 of FIG. 4 may be implemented using a variety of known hardware and/or software. For example, these components may be implemented using special-purpose hardware such as an application specific integrated circuit (ASIC) or field programmable gate array (FPGA), software and/or /firmware running on a general or special purpose computing device such as a microprocessor or a digital signal processing (DSP) chip, or combinations thereof.

Figure 5:
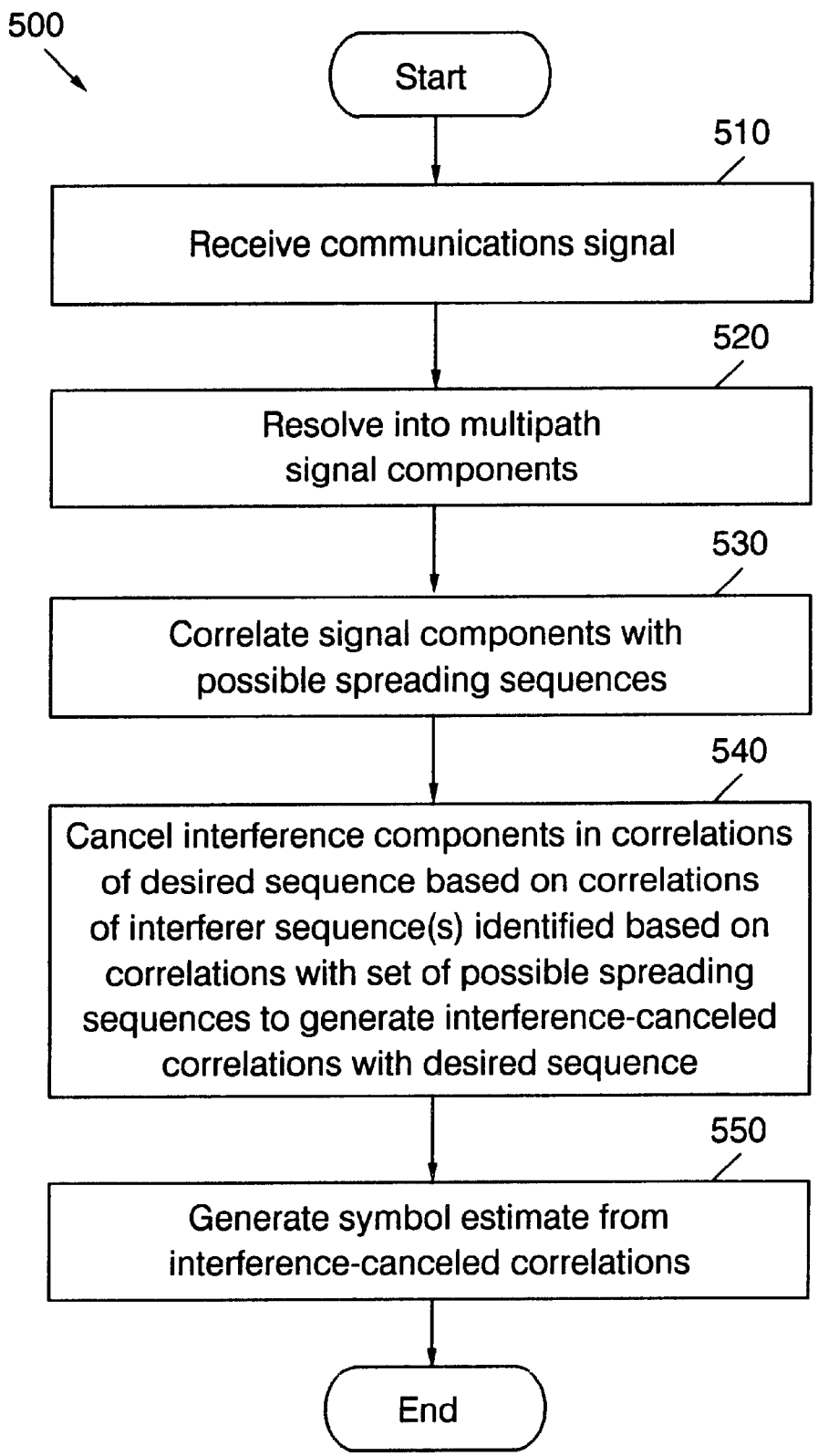
FIG. 5 illustrates exemplary symbol estimation operations according to an embodiment of the present invention.

FIG. 5 illustrates exemplary operations 500 for estimating a symbol transmitted in a communications medium according to a selected spreading sequence of a set of spreading sequences. A communications signal is received (Block 510). The received communications signal is resolved into a plurality of multipath signal components (Block 520), for example, by descrambling according to a cell-specific scrambling code, or by other techniques such as reception at a plurality of spatially diverse antennas. The multipath signal components are then correlated with the set of spreading sequences (Block 530). A respective interference component is canceled from correlations of the selected spreading sequence with the multipath signal components based on correlations of the multipath signal components with one or more interferer spreading sequences to generate interference-canceled correlations of the selected spreading sequence with the multipath signal components (Block 540). A symbol estimate is then generated from the interference-canceled correlations (Block 550).

Figure 6:
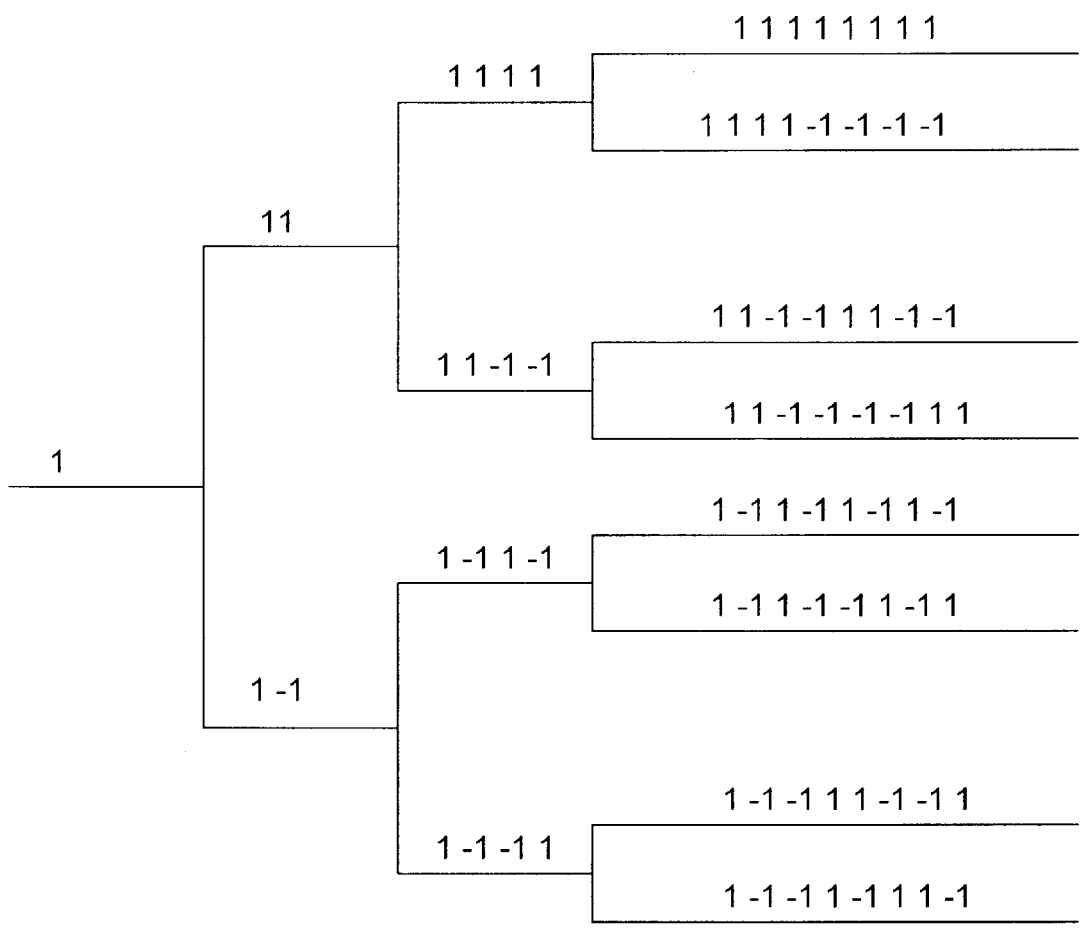
FIG. 6 illustrates a code tree for a variable spreading factor CDMA system.

In W-CDMA, various spreading factors are used to provide various symbol rates. Typically, orthogonal variable spreading factor (OVSF) codes are used. In an OVSF regime, sequences are assigned from a "code tree," such as the one illustrated in FIG. 6, according to a rule that sequences lying on a path from a currently assigned sequence to a root sequence should not be used, to help maintain orthogonality.

Figure 7:
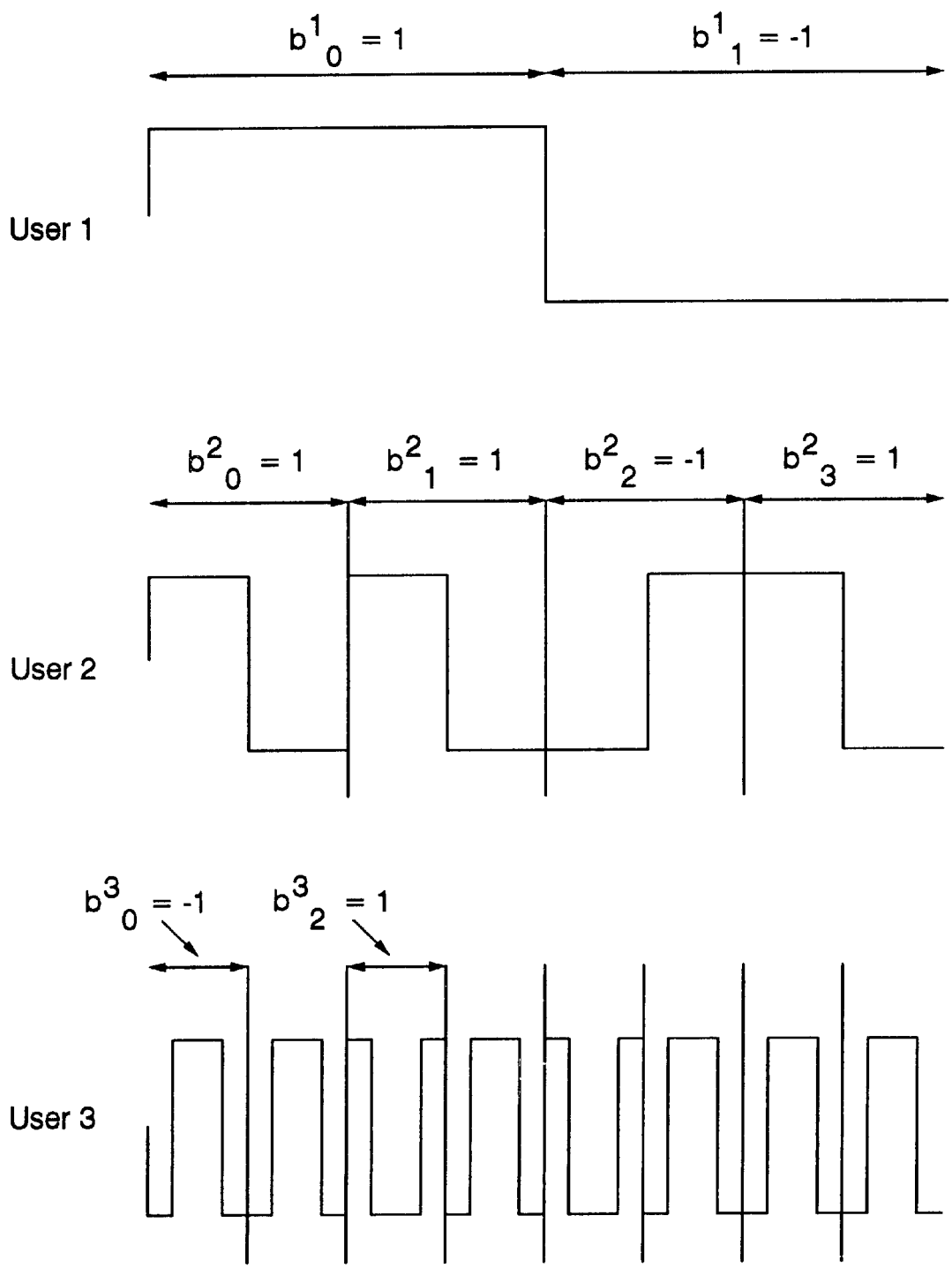
FIG. 7 illustrates relationships between signals with different spreading factors.

FIG. 7 illustrates exemplary waveforms for three different users using respective spreading factors (SFs) of 16, 8, and 4. It can be shown that these signals are orthogonal, regardless of the spreading factor used for despreading. Assuming User 1 is the desired signal, for a first symbol $b_0^1$, User 2 appears to use a SF=16 spreading sequence (1, 1, 1, 1, −1, −1, −1, −1, 1, 1, 1, 1, −1 , −1, −1, −1), which represents a concatenation of two spreading codes used by User 2. For a second symbol $b_1^1$ for User 1, however, User 2 appears to use a SF=16 spreading sequence (1, 1, 1, 1, −1, −1, −1, −1, −1, −1, −1, −1, 1, 1, 1, 1) with a data symbol −1. In other words, although the interfering users (User 2 and User 3) actually employ lower spreading factor sequences than User 1, they can be viewed as using spreading sequences of the same spreading factor as User 1, but which vary from symbol period to symbol period of User 1's signal, the variation being dependent on the actual data symbols for the interfering users ($b_0^2$–$b_3^2$, $b_0^3$–$b_2^3$).

Accordingly, in order to perform interference cancellation in the variable spreading factor case, a new set of interfering spreading codes should be generated for each symbol period of the desired signal. Letting N, N/2 and N/3 denote the spreading factors for Users 1, 2, and 3, respectively:

$$s_1(t) = \sum_i b_i^1 c_1(t - iNT_c),$$

$$s_2(t) = \sum_i b_i^2 c_2\left(t - \frac{iNT_c}{2}\right), \text{ and}$$

$$s_3(t) = \sum_i b_i^3 c_3\left(t - \frac{iNT_c}{4}\right).$$

The signal $s_2(t)$ for User 2 may be rewritten as:

$$s_2(t) = \sum_i \hat{b}_i^2 \hat{c}_{2,i}(t - iNT_c),$$

where $$\hat{b}_i^2 = b_{2i}^2, \text{ and}$$

$\hat{c}_{2,i}(t)$ is the effective spreading waveform for User 2 for the ith symbol of User 1:

$$\hat{c}_{2,i}(t) = c_2(t) + (b_{2i}^2)^* b_{2i+1}^2 c_2\left(t - \frac{NT_c}{2}\right).$$

Similarly, for User 3:

$$s_3(t) = \sum_i \hat{b}_i^3 \hat{c}_{3,i}(t - iNT_c),$$

$$\hat{b}_i^3 = b_{4i}^3, \text{ and}$$

$$\hat{c}_{3,i}(t) = c_3(t) + (b_{4i}^3)^* b_{4i+1}^3 c_3\left(t - \frac{NT_c}{4}\right) +$$

$$(b_{4i}^3)^* b_{4i+2}^3 c_2\left(t - \frac{NT_c}{2}\right) + (b_{4i}^3)^* b_{4i+3}^3 c_2\left(t - \frac{3NT_c}{4}\right).$$

After detecting the effective spreading sequences of the interfering users, the multi-user interference may be given by:

$$z_{1i,MUI} \approx$$

$$\int_{\tau_1}^{\tau_1+NT_c} \left( \sum_{\substack{l=2 \\ l \neq i}}^{L} \alpha_l \left( \sum_{k=2}^{K} \sqrt{P_k}\, \hat{b}_0^k \hat{c}_k(t-\tau_1) \right) a(t-\tau_l) \right) a^*(t-\tau_i) c_1^*(t-\tau_i) dt.$$

As the effective spreading sequences of the interfering users vary from symbol period to symbol period of the desired user signal, the architecture of FIG. 1 is employed.

Figure 2:
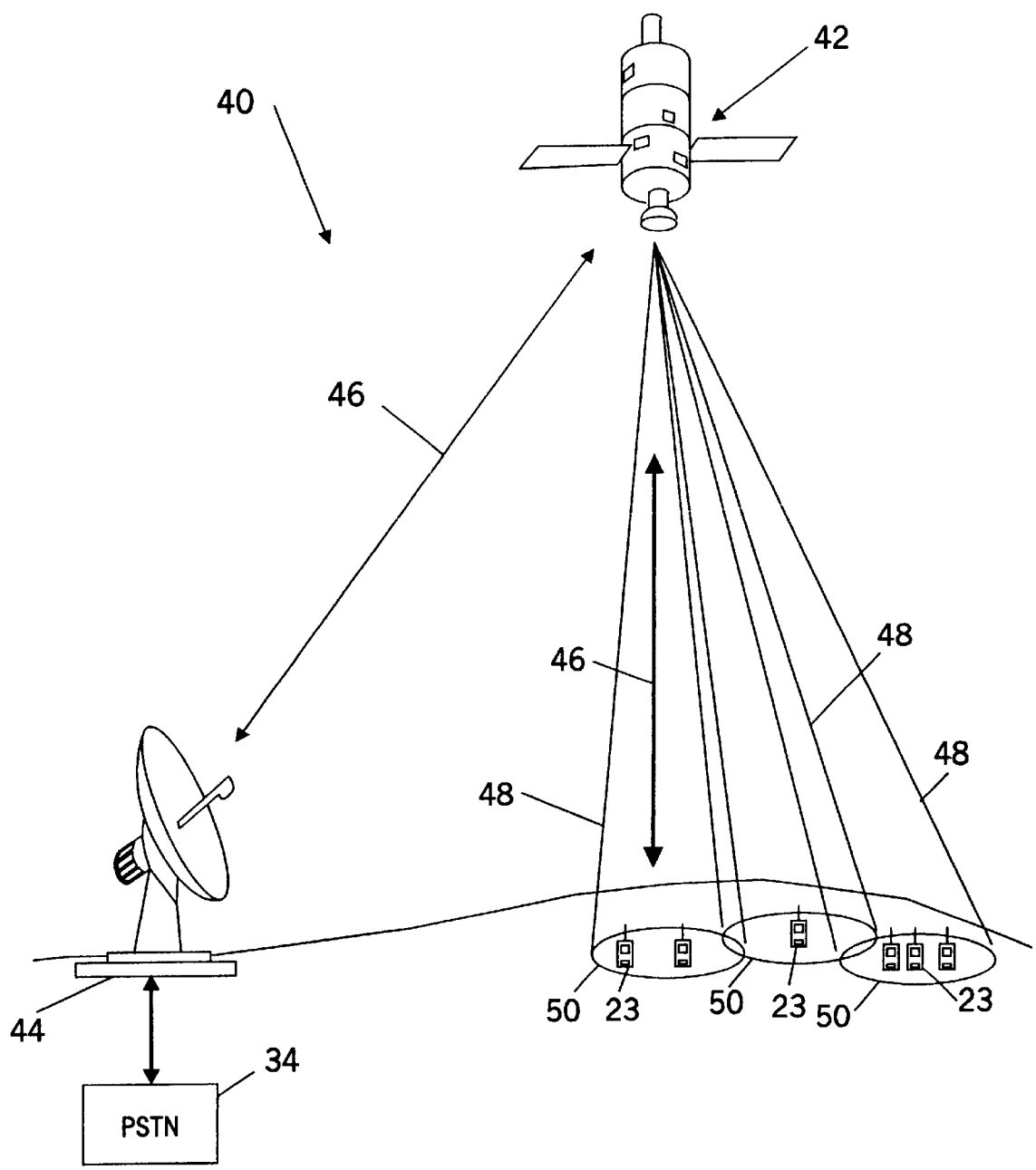
Figure 8:
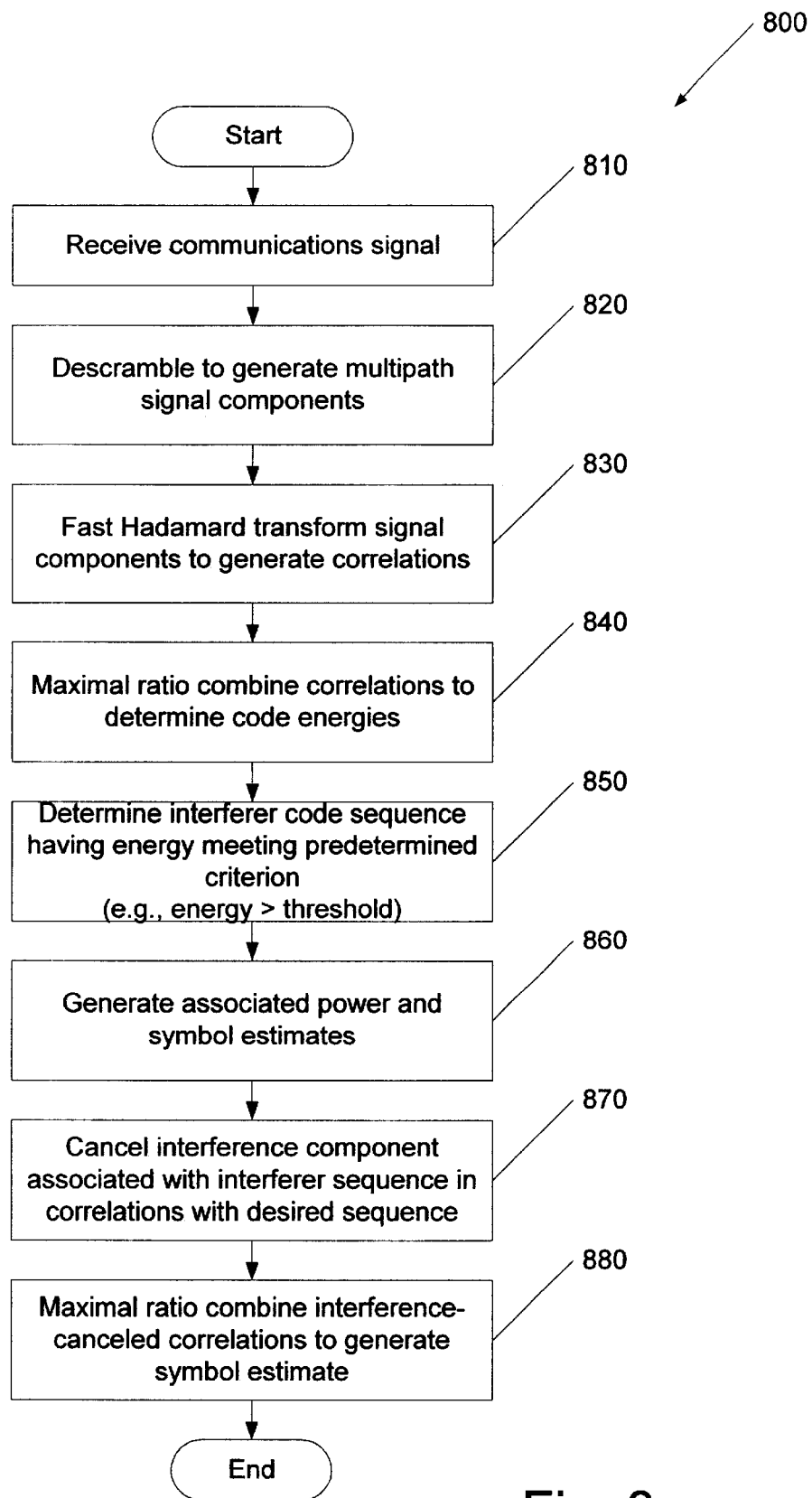

FIGS. 8 and 9 are flowchart illustrations of exemplary operations for generating symbol estimates according to aspects of the present invention. It will be understood that blocks of the flowchart illustrations, and combinations of blocks in the flowchart illustrations, can be implemented by computer program instructions which may be loaded onto a computer, processor or other data processing apparatus to produce a machine such that the instructions which execute on the computer or other data processing apparatus create means for implementing the functions specified in the flowchart block or blocks. For example, blocks of the flowchart illustrations may be implemented as computer instructions that are loaded and executed in a microprocessor, digital signal processor (DSP), application-specific integrated circuit or similar device included in a mobile cellular radiotelephone terminal such as the terminals illustrated in FIGS. 1 and 2. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

FIG. 8 illustrates exemplary operations 800 for generating a symbol estimate from a received communications signal, i.e., from a received signal including a component transmitted according to a desired spreading sequence of a set of possible spreading sequences. The communications signal is received (Block 810), and descrambled to generate multipath signal components (Block 820). The multipath signal components are then fast Hadamard transformed to generate correlations of the multipath signal components with the set of possible spreading sequences (Block 830). The correlations are then maximal ratio combined to determine respective energies of signals associated with the respective possible spreading sequences (Block 840). An interferer code is identified based upon whether the associated energy meets a predetermined criterion based, for example, upon whether the associated energy exceeds a predetermined threshold (Block 850). Corresponding symbol and power estimates are generated for the identified interferer sequence (Block 860), and are used to cancel a corresponding interference component in the correlations of the multipath signal components with the desired spreading sequence (Block 870). The interference-canceled correlations thus generated are then maximal ratio combined to generate a symbol estimate (Block 880).

FIG. 9 illustrates exemplary operations 900 for symbol estimation in which fixed spreading factors are used, allowing identification of interferer sequences on an intermittent basis. M strongest interferer codes (sequences) are determined for a first symbol period of a desired signal (Block 910). A communications signal is received for a second symbol period (Block 920), and is descrambled to produce a plurality of multipath signal components (Block 930). The multipath signal components are correlated with the desired sequence and each of the M identified interferer sequences (Block 940), and symbol and power estimates generated for the desired signal and the M interferer signals for the second symbol period (Block 950). Interference components are canceled from the correlations of the desired sequence with the multipath signal components (Block 960), and the interference-canceled correlations thus generated are combined to produce a symbol estimate for the second symbol period (Block 970).

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. In a spread spectrum communications system, a method of recovering a symbol transmitted in a communications medium according to a first spreading sequence of a set of spreading sequences that may be used to transmit symbols in the system, the method comprising the steps of:

receiving a communications signal from the communications medium;

resolving the received communications signal into a plurality of signal components, a respective one of which is associated with a respective propagation path;

correlating the resolved plurality of signal components with the set of spreading sequences to generate a respective set of correlations for a respective one of the resolved signal components, a respective one of the sets of correlations including a respective correlation of a resolved signal component with the first spreading sequence;

canceling an interference component associated with a second spreading sequence of the set of spreading sequences from the correlations of the plurality of resolved signal components with the first spreading sequence based on the correlations of the plurality of resolved signal components with the second spreading sequence to generate a set of interference-cancelled correlations of the resolved signal components with the first spreading sequence; and estimating the transmitted symbol from the set of interference-cancelled correlations.

2. A method according to claim 1, wherein said step of canceling comprises the step of identifying a second spreading sequence based on the correlations of the set of spreading sequences with the resolved signal components.

3. A method according to claim 1, wherein the set of spreading sequences is orthogonal.

4. A method according to claim 3, wherein the set of spreading sequences comprises a Hadamard code, and wherein said step of correlating comprises the step of fast Hadamard transforming each of the plurality of resolved signal components.

5. A method according to claim 1, wherein the spread spectrum communications system comprises a plurality of geographic cells, and wherein said step of resolving comprises the step of correlating the received communications signal with a set of time-shifted versions of a scrambling code to generate the resolved plurality of signal components.

6. A method according to claim 1, wherein said step of canceling comprises the steps of:

combining correlations for resolved signal components to determine respective energies for respective spreading sequences; and identifying a second spreading sequence having an associated energy meeting a predetermined criterion.

7. A method according to claim 6, wherein said step of combining comprises the step of maximal ratio combining.

8. A method according to claim 6, wherein said step of identifying comprises the step of identifying a second spreading sequence having a highest associated energy.

9. A method according to claim 6, wherein said step of identifying comprises the step of identifying a second spreading sequence having an associated energy exceeding a predetermined threshold.

10. A method according to claim 6, wherein said step of canceling further comprises the steps of:

generating a symbol estimate for an interferer signal transmitted according to the identified second spreading sequence;

generating a power estimate for the interferer signal transmitted according to the identified second spreading sequence; and determining a respective interference component for a respective one of the correlations of the resolved signal components with the first spreading sequence from the second spreading sequence, the symbol estimate for the second spreading sequence and the power estimate for the second spreading sequence.

11. A method according to claim 10:

wherein said step of resolving comprises the steps of:

resolving a received communications signal into a first plurality of signal components for a first symbol period; and resolving a received communications signal into a second plurality of signal components for a second symbol period;

wherein said step of identifying comprises the step of identifying a second spreading sequence for the first symbol period from the first resolved plurality of signal components; and wherein said step of canceling comprises the steps of:

correlating the second resolved plurality of signal components with the first and second spreading sequences to generate respective correlations of the second resolved plurality of signal components with the first and second spreading sequences; and canceling an interference component from the correlations of the second resolved plurality of signal components with the first spreading sequence based on the correlations of the second resolved plurality of signal components with the second spreading sequence to generate a plurality of interference canceled correlations of the second resolved plurality of signal components with the first spreading sequence; and wherein said step of estimating comprises the step generating an estimate of a symbol for the second symbol period from the interference-cancelled correlations of the plurality of resolved signal components for the second symbol period with the first spreading sequence.

12. A method according to claim 6:

wherein said step of correlating comprises the step of correlating resolved signal components for each of a succession of symbol periods for the first spreading sequence with each of the spreading sequences; and wherein said step of identifying comprises the step of identifying a second spreading sequence for each of the symbol periods.

13. A method according to claim 1, wherein said step of estimating comprises the step of combining the interference-cancelled correlations of the resolved signal components and the first spreading sequence to generate an estimate of the transmitted symbol.

14. A method according to claim 13, wherein said step of combining comprises the step of maximal ratio combining.

15. In a code division multiple access (CDMA) communications system in which a base station and terminals communicate within a cell according to a cell-specific scrambling code and a terminal-specific spreading sequence selected from a set of spreading sequences of a Hadamard code, a method of recovering a symbol transmitted in a communications medium according to a first spreading sequence, the method comprising the steps of:

receiving a communications signal from the communications medium;

descrambling the received communications signal according to the scrambling code to resolve the received communications signal into a plurality of multipath signal components;

fast Hadamard transforming the plurality of multipath signal components to generate respective sets of correlations of the plurality of multipath signal components with the set of spreading sequences, a respective one of the sets of correlations including a respective correlation of a multipath signal component with the first spreading sequence;

canceling an interference component associated with a second spreading sequence of the set of spreading sequences from the correlations of the plurality of multipath signal components with the first spreading sequence based on the correlations of the plurality of multipath signal components with the second spreading sequence to generate a set of interference-cancelled correlations of the resolved multipath signal components with the first spreading sequence; and estimating the transmitted symbol from the set of interference-cancelled correlations of the multipath signal components with the first spreading sequence.

16. A method according to claim 15, wherein the symbol is transmitted from a base station, and wherein said steps of receiving, fast Hadamard transforming, canceling and estimating are performed at a terminal.

17. A method according to claim 15, wherein said step of canceling comprises the step of identifying a second spreading sequence based on the correlations of the set of spreading sequences with the multipath signal components.

18. A method according to claim 15, wherein said step of canceling comprises the steps of:

combining correlations for multipath signal components to determine respective energies for respective spreading sequences; and identifying a second spreading sequence having an associated energy meeting a predetermined criterion.

19. A method according to claim 18, wherein said step of combining comprises the step of maximal ratio combining.

20. A method according to claim 18, wherein said step of identifying comprises the step of identifying a second spreading sequence having a highest associated energy.

21. A method according to claim 18, wherein said step of identifying comprises the step of identifying a second spreading sequence having an associated energy exceeding a predetermined threshold.

22. A method according to claim 18, wherein said step of canceling further comprises the steps of:

generating a symbol estimate for an interferer signal transmitted according to the identified second spreading sequence;

generating a power estimate for interferer signal transmitted according to the identified second spreading sequence; and determining a respective interference component for a respective one of the correlations of the multipath signal components with the first spreading sequence from the second spreading sequence, the symbol estimate for the second spreading sequence and the power estimate for the second spreading sequence.

23. An apparatus for recovering a symbol transmitted in a communications medium in a spread spectrum communications according to a first spreading sequence of a set of a spreading sequences, the apparatus comprising:

means for receiving a communications signal from the communications medium;

means for resolving the received communications signal into a plurality of signal components, a respective one of which is associated with a respective propagation path;

means for correlating the resolved plurality of signal components with the set of spreading sequences to generate a respective set of correlations for a respective one of the resolved signal components, a respective one of the sets of correlations including a respective correlation of a resolved signal component with the first spreading sequence;

means for canceling an interference component associated with a second spreading sequence of the set of spreading sequences from the correlations of the plurality of resolved signal components with the first spreading sequence based on the correlations of the plurality of resolved signal components with the second spreading sequence to generate a set of interference-cancelled correlations of the resolved signal components with the first spreading sequence; and means for estimating the transmitted symbol from the set of interference-cancelled correlations of the resolved signal components with the first spreading sequence.

24. An apparatus according to claim 23, wherein said means for canceling comprises means, responsive to said means for correlating, for identifying a second spreading sequence associated with an interferer signal based on the correlations of the set of spreading sequences with the resolved signal components.

25. An apparatus according to claim 23, wherein the set of spreading sequences is orthogonal.

26. An apparatus according to claim 25, wherein the set of spreading sequences comprises a Hadamard code, and wherein said means for correlating comprises means for fast Hadamard transforming each of the plurality of resolved signal components.

27. An apparatus according to claim 23, wherein the spread spectrum communications system comprises a plurality of geographic cells, and wherein said means for resolving comprises means for descrambling according to a cell-specific scrambling code to generate the resolved plurality of signal components.

28. An apparatus according to claim 23, wherein said means for canceling comprises:

means, responsive to said means for correlating, for combining correlations of resolved signal components to determine respective energies for respective spreading sequences; and means, responsive to said means for combining, for identifying a second spreading sequence having an associated energy meeting a predetermined criterion.

29. An apparatus according to claim 28, wherein said means for combining comprises means for maximal ratio combining.

30. An apparatus according to claim 28, wherein said means for identifying comprises means for identifying a second spreading sequence having a highest associated energy.

31. An apparatus according to claim 28, wherein said means for identifying comprises means for identifying a second spreading sequence having an associated energy exceeding a predetermined threshold.

32. An apparatus according to claim 28, wherein said means for canceling further comprises:

means, responsive to said means for identifying and to said means for combining, for generating a symbol estimate for the identified second spreading sequence;

means, responsive to said means for identifying and to said means for combining, for generating a power estimate for the identified second spreading sequence; and means, responsive to said means for generating a symbol estimate and to said means for generating a power estimate, for determining a respective interference component for a respective one of the correlations of the resolved signal components with the first spreading sequence from the second spreading sequence, the symbol estimate for the second spreading sequence and the power estimate for the second spreading sequence.

33. An apparatus according to claim 32:

wherein said means for resolving comprises:

means for resolving a received communications signal into a first plurality of signal components for a first symbol period; and means for resolving a received communications signal into a second plurality of signal components for a second symbol period;

wherein said means for identifying comprises means for identifying a second spreading sequence for the first symbol period from the first resolved plurality of signal components; and wherein said means for canceling comprises:

means for correlating the second resolved plurality of signal components with the first and second spreading sequences to generate respective correlations of the second resolved plurality of signal components with the first and second spreading sequences; and means for canceling the determined interference component from the correlations of the second resolved plurality of signal components with the first spreading sequence based on the correlations of the resolved second plurality of signal components with the second spreading sequence to generate a plurality of interference canceled correlations of the second resolved plurality of signal components with the first spreading sequence; and wherein said means for estimating comprises means for generating an estimate of a symbol for the second symbol period from the interference-cancelled correlations of the plurality of resolved signal components for the second symbol period with the first spreading sequence.

34. An apparatus according to claim 28:

wherein said means for correlating comprises means for correlating resolved signal components for each of a succession of symbol periods for the first spreading sequence with each of the spreading sequences; and wherein said means for identifying comprises means for identifying a second spreading sequence for each of the symbol periods.

35. An apparatus according to claim 23, wherein said means for estimating comprises means for combining the interference-cancelled correlations of the resolved signal components and the first spreading sequence to generate an estimate of the transmitted symbol.

36. An apparatus according to claim 35, wherein said means for combining comprises means for maximal ratio combining.

37. An apparatus for recovering a symbol from a communications signal, the apparatus comprising:

a multipath resolver operative to resolve the communications signal into a plurality of signal components, a respective one of which is associated with a respective propagation path;

a spreading sequence correlator responsive to said multipath resolver and operative to correlate resolved signal components with a set of spreading sequences to generate a respective set of correlations for a respective one of the resolved signal components, a respective one of the sets of correlations including a respective correlation of a resolved signal component with a first spreading sequence;

an interference canceler responsive to said spreading sequence correlator and operative to cancel an interference component associated with an interferer using a second spreading sequence of the set of spreading sequences from the correlations of the plurality of resolved signal components with the first spreading sequence based on the correlations of the plurality of resolved signal components with the second spreading sequence to generate a set of interference-cancelled correlations of the resolved signal components with the first spreading sequence; and a symbol estimator responsive to said interference canceler and operative to estimate the transmitted symbol from the set of interference-cancelled correlations of the resolved signal components with the first spreading sequence.

38. An apparatus according to claim 37, wherein the set of spreading sequences is orthogonal.

39. An apparatus according to claim 38, wherein the set of spreading sequences comprises a Hadamard code, and wherein said spreading sequence correlator comprises a fast Hadamard transformer.

40. An apparatus according to claim 37, wherein said multipath resolver comprises a descrambler.

41. An apparatus according to claim 37, wherein said interference canceler comprises means for identifying a second spreading sequence based on the correlations of the set of spreading sequences with the resolved signal components.

42. An apparatus according to claim 37, wherein said interference canceler comprises:

a maximal ratio combiner operative to combine correlations for resolved signal components to determine respective energies for respective spreading sequences; and means, responsive to said maximal ratio combiner, for identifying a second spreading sequence having an associated energy meeting a predetermined criterion.

43. An apparatus according to claim 42, wherein said means for identifying comprises means for identifying a second spreading sequence having a highest associated energy.

44. An apparatus according to claim 42, wherein said means for identifying comprises means for identifying a second spreading sequence having an associated energy exceeding a predetermined threshold.

45. An apparatus according to claim 42, wherein said interference canceler comprises:

a symbol estimator, responsive to said maximal ratio combiner and to said means for identifying and operative to generate a symbol estimate for an interferer signal transmitted according to the identified second spreading sequence;

a power estimator, responsive to said maximal ratio combiner and to said means for identifying and operative to generate a power estimate for the interferer signal transmitted according to the identified second spreading sequence; and means, responsive to said symbol estimator and to said power estimator, for determining a respective interference component for a respective one of the correlations of the resolved signal components with the first spreading sequence from the second spreading sequence, the symbol estimate for the second spreading sequence and the power estimate for the second spreading sequence.

46. In a code division multiple access (CDMA) communications system in which a base station and terminals communicate within a cell according to a cell-specific scrambling code and a terminal-specific spreading sequence of set of spreading sequences of a Hadamard code, an apparatus for recovering a symbol from a received communications signal, the apparatus comprising:

a descrambler operative to resolve the received communications signal into a plurality of multipath signal components;

a plurality of fast Hadamard transformers responsive to said descrambler and operative to generate respective sets of correlations of the plurality of multipath signal components with the spreading sequences, a respective one of the sets of correlations including a respective correlation of a multipath signal component with the first spreading sequence;

an interference canceler responsive to said plurality of fast Hadamard transformers and operative to cancel an interference component associated with a second spreading sequence of the set of spreading sequences from the correlations of the plurality of resolved signal components with the first spreading sequence based on the correlations of the plurality of resolved signal components with the second spreading sequence to generate a set of interference-cancelled correlations of the resolved multipath signal components with the first spreading sequence; and a symbol estimator responsive to said interference canceler and operative to estimate the transmitted symbol from the set of interference-cancelled correlations of the resolved signal components with the first spreading sequence.

47. An apparatus according to claim 46, wherein said interference canceler comprises means for identifying a second spreading sequence based on the correlations of the set of spreading sequences with the multipath signal components.

48. An apparatus according to claim 46, wherein interference canceler comprises:

a maximal ratio combiner responsive to said plurality of fast Hadamard transformers and operative to combine the sets of correlations for the multipath signal components to determine respective energies for the spreading sequences; and means, responsive to said maximal ratio combiner, for identifying a second spreading sequence having an associated energy meeting a predetermined criterion.

49. An apparatus according to claim 47, wherein said means for identifying comprises means for identifying a second spreading sequence having a highest associated energy.

50. An apparatus according to claim 47, wherein said means for identifying comprises means for identifying a second spreading sequence having an associated energy exceeding a predetermined threshold.

51. An apparatus according to claim 47, wherein said interference canceler further comprises:

means, responsive to said maximal ratio combiner and to said means for identifying, for generating a symbol estimate for an interferer signal transmitted according to the identified second spreading sequence;

means, responsive to said maximal ratio combiner and to said means for identifying, for generating a power estimate for the interferer signal transmitted according to the identified second spreading sequence; and means, responsive to said means for generating a symbol estimate and to said means for generating a power estimate, for determining a respective interference component for a respective one of the correlations of the multipath signal components with the first spreading sequence from the second spreading sequence, the symbol estimate for the second spreading sequence and the power estimate for the second spreading sequence.

* * * * *